(12) United States Patent
Zhou et al.

(10) Patent No.: US 11,330,264 B2
(45) Date of Patent: May 10, 2022

(54) TRAINING METHOD, IMAGE ENCODING METHOD, IMAGE DECODING METHOD AND APPARATUSES THEREOF

(71) Applicant: Fujitsu Limited, Kawasaki (JP)

(72) Inventors: Jing Zhou, Beijing (CN); Akira Nakagawa, Kawasaki (JP); Sihan Wen, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/182,433

(22) Filed: Feb. 23, 2021

(65) Prior Publication Data

US 2021/0297667 A1  Sep. 23, 2021

(30) Foreign Application Priority Data

Mar. 23, 2020 (CN) .............. 202010208845

(51) Int. Cl.
  *H04B 1/66* (2006.01)
  *H04N 7/12* (2006.01)
  *H04N 11/04* (2006.01)
  *H04N 19/124* (2014.01)
  *H04N 19/184* (2014.01)

(52) U.S. Cl.
  CPC ......... *H04N 19/124* (2014.11); *H04N 19/184* (2014.11)

(58) Field of Classification Search
  CPC ... H04N 19/146; H04N 19/184; H04N 19/172
  See application file for complete search history.

(56) References Cited

U.S. PATENT DOCUMENTS

| 10,192,327 | B1 | 1/2019 | Toderici et al. |
| 11,138,409 | B1* | 10/2021 | Krueger ............... H04L 9/3271 |
| 2012/0301040 | A1 | 11/2012 | Yie et al. |
| 2018/0152704 | A1 | 5/2018 | Nguyen et al. |
| 2019/0251612 | A1* | 8/2019 | Fang ..................... G06T 11/00 |
| 2020/0104640 | A1* | 4/2020 | Poole ................... G06K 9/6267 |

(Continued)

FOREIGN PATENT DOCUMENTS

| CN | 102724495 | 10/2012 |
| CN | 103250412 | 8/2013 |

OTHER PUBLICATIONS

Kato K, Zhou J, Sasaki T, Nakagawa A. Rate-Distortion Optimization Guided Autoencoder for Isometric Embedding in Euclidean Latent Space. arXiv preprint arXiv:1910.04329. Oct. 10, 2019. (Year: 2019).*

(Continued)

*Primary Examiner* — Fabio S Lima
(74) *Attorney, Agent, or Firm* — Staas & Halsey LLP

(57) ABSTRACT

Embodiments of this disclosure provide a training method, an image encoding method, an image decoding method and apparatuses thereof. The image encoding apparatus includes: an image encoder configured to encode input image data to obtain a latent variable; a quantizer configured to perform quantizing processing on the latent variable according to a quantization step to generate a quantized latent variable; and an entropy encoder configured to perform entropy coding on the quantized latent variable by using an entropy model to form a bit stream.

9 Claims, 5 Drawing Sheets

(56) References Cited

U.S. PATENT DOCUMENTS

| | | | |
|---|---|---|---|
| 2021/0150330 A1* | 5/2021 | Sharma | G06N 3/0454 |
| 2021/0150357 A1* | 5/2021 | Karras | G06N 3/04 |
| 2021/0256393 A1* | 8/2021 | Amjadian | H04L 63/08 |

OTHER PUBLICATIONS

Chen Xian-yi, et al., "A New HEVC Intra Mode for Screen Content Coding", Journal of Electronics & Information Technology, vol. 37 No. 11, 2015, 6 pages.

Keizo Kato, et al., "Rate-Distortion Optimization Guided Autoencoder for Isometric Embedding in Euclidean Latent Space", Computer Science, Oct. 10, 2019, 23 pages.

* cited by examiner

TRAINING METHOD, IMAGE ENCODING METHOD, IMAGE DECODING METHOD AND APPARATUSES THEREOF

CROSS-REFERENCE TO RELATED APPLICATIONS

This application is based on and hereby claims priority to Chinese Application No. 202010208845.5, filed Mar. 23, 2020, in the State Intellectual Property Office of China, the disclosure of which is incorporated herein by reference.

TECHNICAL FIELD

This disclosure relates to the field of image processing.

BACKGROUND

With the development of computer technologies, applications of images have become more and more extensive. In order to store or transmit image files efficiently, images need to be encoded, and results of the encoding may be converted into a bit stream. By decoding the bit stream, the images may be reproduced.

A deep neural network has become a promising research direction in the field of image encoding. A non-linear transform encoding method designed based on the deep neural network has better performance than a conventional image encoding method. The conventional image encoding method is, for example, a better portable graphics (BPG) encoding method.

In an image encoding method based on a deep neural network, a key challenge is how to achieve a tradeoff between a bit rate and a level of distortion. The bit rate reflects a magnitude of a bit stream of an image relative to a size of the image. For example, the bit rate may be equal to a quotient obtained by dividing a length of the bit stream by a product of a length and a width of the image; and the distortion reflects a difference between an image obtained after decoding and the original image.

Usually, a Lagrange multiplier may be introduced to achieve the tradeoff between the bit rate and the level of distortion. For example, in training an encoder based on a deep neural network, training may be performed based on a loss function (R+$\lambda$*D); where, R denotes the bit rate, D denotes the level of distortion, and $\lambda$ is an adjustable parameter.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided a training device for an image processing apparatus, in which an image encoder and an image decoder are trained by using a training image, the training device including:

a first acquiring unit configured to acquire a latent variable z obtained by the image encoder by encoding input training image data;

a second acquiring unit configured to acquire first restored image data obtained by the image decoder by decoding the latent variable z and second restored image data obtained by the image decoder by decoding a sum (z+$\varepsilon$) of the latent variable z and a noise $\varepsilon$; and a training unit configured to train the image encoder and the image decoder according to a cost function L, the cost function L being related to a deviation between the input training image data x and the first restored image data and a deviation between the first restored image data and the second restored image data.

According to an embodiment of this disclosure, there is provided an image encoding apparatus, the image encoding apparatus including:

an image encoder configured to encode input image data x to obtain a latent variable z, the image encoder being obtained by training by the training device as described in the first aspect;

a quantizer configured to perform quantizing processing on the latent variable z according to a quantization step Q to generate a quantized latent variable; and an entropy encoder configured to perform entropy coding on the quantized latent variable by using an entropy model to form a bit stream.

According to an embodiment of this disclosure, there is provided an image decoding apparatus, the image decoding apparatus including:

an entropy decoder configured to perform entropy decoding on a bit stream by using an entropy model to form a quantized latent variable;

a de-quantizer configured to perform de-quantizing processing on the quantized latent variable according to a quantization step Q to generate a reconstructed latent variable; and an image decoder configured to perform decoding processing on the reconstructed latent variable to obtain restored image data $\hat{x}$, the image decoder being obtained by training by the training device as described in the first aspect.

According to an embodiment of this disclosure, there is provided a training method for an image processing method, in which an image encoder and an image decoder are trained by using a training image, the training method including:

acquiring a latent variable z obtained by the image encoder by encoding input training image data;

acquiring first restored image data obtained by the image decoder by decoding the latent variable z and second restored image data obtained by the image decoder by decoding a sum (z+$\varepsilon$) of the latent variable z and a noise $\varepsilon$; and training the image encoder and the image decoder according to a cost function L, the cost function L being related to a deviation between the input training image data x and the first restored image data and a deviation between the first restored image data and the second restored image data.

According to an embodiment of this disclosure, there is provided an image encoding method, including:

encoding input image data x by an image encoder to obtain a latent variable z, the image encoder being obtained in the training method as described in the fourth aspect;

performing quantizing processing on the latent variable z by a quantizer according to a quantization step Q to generate a quantized latent variable; and performing entropy coding on the quantized latent variable by an entropy encoder by using an entropy model to form a bit stream.

According to a sixth aspect of the embodiments of this disclosure, there is provided an image decoding method, including:

performing entropy decoding on a bit stream by an entropy decoder by using an entropy model to form a quantized latent variable;

performing de-quantizing processing on the quantized latent variable by a de-quantizer according to a quantization step Q to generate a reconstructed latent variable; and performing decoding processing on the reconstructed latent variable by an image decoder to obtain restored image data x̂, the image decoder being obtained by training in the training method as described in the fourth aspect.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

In the drawings.

DETAILED DESCRIPTION

These and further aspects and features of this disclosure will be apparent with reference to the following description and attached drawings. Implementations are illustrative only, and are not intended to limit this disclosure. These implementations of the embodiments of this disclosure shall be described below with reference to the accompanying drawings.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

After obtaining the network of the encoder by training based on the loss function (R+λ*D), the bit rate and level of distortion of the image may be determined.

It was found by the inventors that if the bit rate needs to be adjusted, a value of λ is usually modified for multiple times, and corresponding to each value of λ, it is needed to retrain the network of the encoder and determine a network of the encoder with a bit rate closest to a needed bit rate, and a method for adjusting a bit rate is relatively cumbersome.

Embodiments of this disclosure provide a training method, an image encoding method, an image decoding method and apparatuses thereof, wherein an image encoder obtained according to the training method is able to expediently achieve adjustment of different bit rates.

An advantage of the embodiments of this disclosure exists in that the image encoder obtained according to the training method is able to expediently achieve adjustment of different bit rates.

Embodiment of the First Aspect

Figure 1:
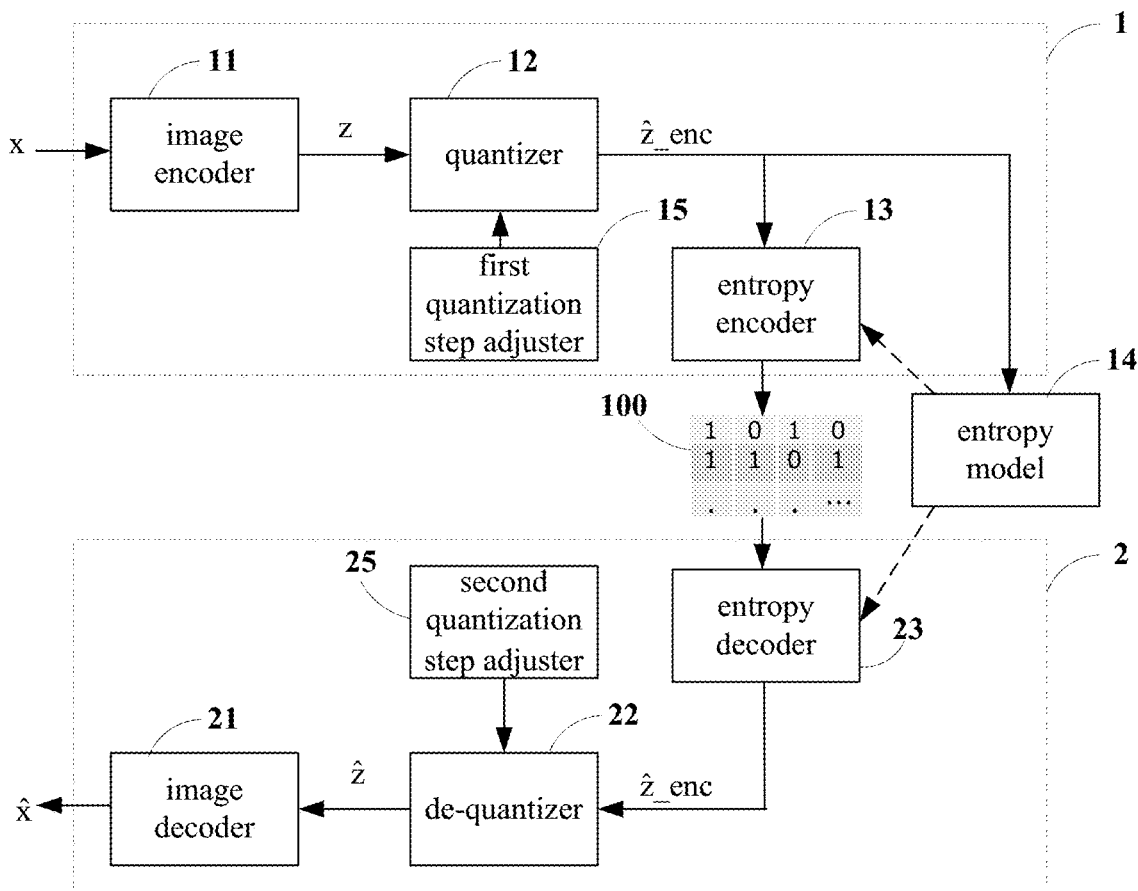
FIG. 1 is a schematic diagram of the image encoding apparatus and the image decoding apparatus of an embodiment of this disclosure.

Embodiment of the first aspect of this disclosure provides an image encoding apparatus and an image decoding apparatus. FIG. 1 is a schematic diagram of the image encoding apparatus and the image decoding apparatus.

As shown in FIG. 1, the image encoding apparatus 1 may process image data x to form a bit stream 100, which may be stored or transmitted to the image decoding apparatus 2 via a transmission medium. The image decoding apparatus 2 processes the received bit stream 100 to form restored image data x̂, whereby the image data x inputted into the image encoding apparatus 1 are reproduced as image data x̂ in the image decoding apparatus 2.

As shown in FIG. 1, the image encoding apparatus 1 may include: an image encoder 11, a quantizer 12 and an entropy encoder 13.

The image encoder 11 encodes the inputted image data x to obtain a latent variable z. The image encoder 11 may perform encoding processing based on a deep neural network. For example, the image encoder 11 may be implemented via a basic convolution layer and/or a deconvolution layer, and/or by taking generalized divisive normalization (GDN)/inverse generalized divisive normalization (IGDN)

as an activation function. Reference may be made to related techniques for a concept and contents of the deep neural network.

The quantizer 12 may perform quantizing processing according to a quantization step Q on the latent variable z outputted by the image encoder 11 to generate a quantized latent variable ẑ_enc. The latent variable z is float data, and the float data are transformed into data with finite lengths.

The entropy encoder 13 performs entropy coding on the quantized latent variable ẑ_enc by using an entropy model 14 to form the bit stream 100. The bit stream 100 may also be referred to as a bit stream, and is a data stream containing multiple bits. Through the entropy coding, the quantized latent variable ẑ_enc that is difficult to be stored and transmitted is converted into the bit stream 100 that is easy to be stored and transmitted. In addition, entropy coding is coding based on the entropy principle without losing information. Therefore, the information contained in the bit stream 100 may completely reflect information in the quantized latent variable ẑ_enc.

In at least one embodiment, the entropy model 14 may be used to estimate entropy of the latent variable z, and the entropy encoder 13 may perform entropy coding on a result of the entropy estimation of the latent variable z based on the entropy model 14. The entropy model 14 may be, for example, a factorized entropy model.

The bit rate R of the bit stream 100 generated by the entropy encoder 13 may be expressed as R=n/(W*H); where, n denotes the length of the bit stream 100, and W and H respectively denote a width and a length of an image to which the image data x correspond, both the width and length being expressed by the number of pixels.

The bit stream 100 generated by the entropy encoder 13 may be stored or transmitted to the image decoding apparatus 2.

As shown in FIG. 1, the image decoding apparatus 2 may include: an image decoder 21, a de-quantizer 22 and an entropy decoder 23.

The entropy decoder 23 performs entropy decoding on the received bit stream 100 by using the entropy model 14 to form the quantized latent variable ẑ_enc. The processing of the entropy decoding may be reverse processing of the entropy coding processing of the entropy encoder 13.

The de-quantizer 22 performs de-quantizing processing on the quantized latent variable ẑ_enc according to the quantization step Q to generate the reconstructed latent variable ẑ. The de-quantizing processing may be inverse processing of the quantizing processing.

The image decoder 21 performs decoding processing on the reconstructed latent variable ẑ to obtain restored image data 2. The image decoder 21 may perform the decoding processing based on a deep neural network. For example, the image decoder 21 may be implemented via a basic convolution layer and/or a deconvolution layer, and/or by taking generalized divisive normalization (GDN)/inverse generalized divisive normalization (IGDN) as an activation function. Reference may be made to related techniques for a concept and contents of the deep neural network.

In at least one embodiment, the image encoder 11 and the image decoder 21 may be an image encoder and image decoder based on a rate-distortion optimization guided autoencoder for generative analysis (RaDOGAGA) model. Reference may be made to related techniques for a detailed principle of the RaDOGAGA model, such as that described on the following webpage: https://arxiv.org/abs/1910.04329.

In at least one embodiment, the image encoder 11 and the image decoder 21 may be trained by using a training device based on the RaDOGAGA model.

Figure 2:
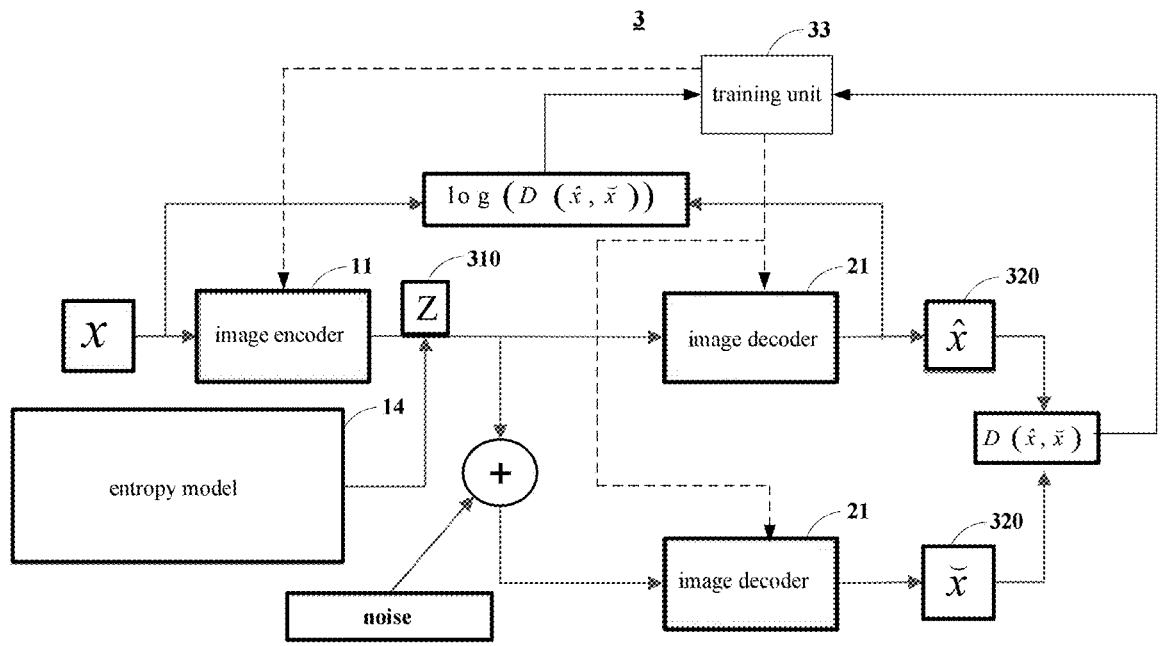
FIG. 2 is a schematic diagram of the training device of an embodiment of this disclosure.

FIG. 2 is a schematic diagram of the training device of the embodiment of this disclosure. As shown in FIG. 2, the training device 3 may include: a first acquiring unit 310, a second acquiring unit 320 and a training unit 33.

As shown in FIG. 2, the first acquiring unit 310 acquires a latent variable z obtained by the image encoder 11 by encoding input training image data. For example, z may be expressed as the following formula (1):

$$z = f_\theta(x) \quad (1);$$

where, $f_\theta$ denotes the encoding processing of the image encoder 11, the encoding processing taking $\theta$ as a parameter.

The second acquiring unit 320 acquires first restored image data x̂ obtained by the image decoder 21 by decoding the latent variable z and acquires second restored image data x̌ obtained by the image decoder 21 by decoding a sum (z+ε) of the latent variable z and a noise ε. For example, x̂ and x̌ may be expressed as the following formula (2):

$$\hat{x} = g_\phi(z), \check{x} = g_\phi(z+\varepsilon) \quad (2);$$

where, $g_\phi$ denotes the decoding processing of the image decoder 21, the encoding processing taking $\phi$ as a parameter. In addition, the noise E may be a uniform noise.

The training unit 33 trains the image encoder 11 and the image decoder 21 according to a cost function L, the cost function L being related to a deviation (h(D(x,x̂))) between the input training image data x and the first restored image data x̂ and a deviation (D(x̂,x̌)) between the first restored image data x̂ and the second restored image data x̌. Furthermore, training the image encoder 11 and the image decoder 21 by the training unit 33 refers to that the training unit 33 trains a network in the image encoder 11 and a network in the image decoder 21.

In at least one embodiment, the cost function L may be expressed as the following equation (3):

$$L = -\log(P_{z,\psi}(z)) + \lambda_1 \times h(D(x,\hat{x})) + \lambda_2 \times D(\hat{x},\check{x}) \quad (3).$$

In the first term $\log(P_{z,\psi}(z))$ of formula (3), $P_{z,\psi}(z)$ denotes a probability of the latent variable z, which takes latent variables z and ψ as parameters. A cumulative density function (CDF) of the latent variable z may be obtained by the entropy model 14 in FIG. 1, and according to the cumulative density function CDF, a probability $P_z(z)$ may be estimated based on univariate independent distribution.

Furthermore, in the entropy model 14, the cumulative density function CDF may conform to a relationship shown in the following formulae (4a) and (4b):

$$P_z(z) = CFD_{z,\psi}\left(z + \frac{\alpha}{2}\right) - CFD_{z,\psi}\left(z - \frac{\alpha}{2}\right), \text{ and} \quad (4a)$$

$$R_z = -\sum \log_2\left(CFD_{z,\psi}\left(z + \frac{\alpha}{2}\right) - CFD_{z,\psi}\left(z - \frac{\alpha}{2}\right)\right)/(H \times W); \quad (4b)$$

where, α denotes a quantization step of a bit rate of the latent variable z, and $R_z$ denotes the bit rate of the latent variable z. H and W respectively denote a height and width of the input image.

In formula (3), the second term $\lambda_1 \times h(D(x,\hat{x}))$ is used to calculate reconstruction losses of the image encoder 11 and the image decoder 21, and the third term $\lambda_2 \times D(\hat{x},\check{x})$ reflects a scaling relationship between an image and a latent space. $\lambda_1$ is used to control a degree of reconstruction, and $\lambda_2$ is used to control a scaling ratio between the image and the latent space.

In the second term $\lambda_1 \times h(D(\hat{x}, \tilde{x})$ and third term $\lambda_2 \times D(\hat{x}, \tilde{x})$ of formula (3), $D(x_1, x_2)$ is a distortion function of a difference between $x_1$ and $x_2$. Deformation parameters used in the field of image encoding may be a mean square error (MSE), a peak signal-to-noise ratio (PSNR), a multi-scale structural similarity (MS-SSIM) index, or a structural similarity (SSIM) index. Corresponding to the aforementioned deformation parameters, the deformation function $D(x_1, x_2)$ may be a mean square error (MSE) deformation function, a peak signal-to-noise ratio (PSNR) deformation function, a multi-scale structural similarity (MS-SSIM) index deformation function, or a structure similarity (SSIM)) index deformation function.

In the second term of formula (3), h(D) may be log(D). Hence, a curve of the loss function is steeper around log(D)=0, so that the image encoder 11 and the image decoder 21 may get better reconstruction characteristics and orthogonality. However, this disclosure is not limited thereto, and h(D) may also be D.

In a particular example, a shape of the input training image x is H*W*3; where, H is the height of the training image x, W is the width of the training image x, and 3 denotes 3 channels; a value of the noise c is between −0.5~0.5, and a value of a is 0.2; in the image encoder 11, a shape of each generated feature image is of H/16*W/16; in a first stage of training, a minimum mean square error (MSE) deformation function is used as the deformation function, h(D)=D; and in a second stage of training, a multi-scale structural similarity (MS-SSIM) index deformation function $MS_{SSIM}(x_1, x_2)$ is used as the deformation function $D(x_1, x_2)$, h(D)=log(D), that is, in the second stage of training, the image encoder 11 and the image decoder 21 are trained by using a loss function L of the following formula (5):

$$L = \log(P_{z,\psi}(z)) + \lambda_1 \times \log(1 - MS_{SSIM}(x, \hat{x})) + \lambda_2 \times MS_{SSIM}(\hat{x}, \tilde{x}) \quad (5).$$

In formula (5), $\lambda_1$ may be 1, and $\lambda_2$ may be greater than 100.

A process of training the image encoder 11 and the image decoder 21 by the training device 3 is described above with reference to FIG. 2. There exists an equidistant relationship between a feature layer space of the model obtained by training by using the above cost function L and the MS-SSIM space, that is, the feature layer is optimized to be orthogonal to an inner product space of the deformation function, and its function is similar to that of discrete cosine transform (DCT) used in Joint Photographic Experts Group (JPEG). MSE $(x_1, x_2)$, or SSIM $(x_1, x_2)$, etc., may be taken as D $(x_1, x_2)$ in training process. For example, if MSE $(x_1, x_2)$ is taken as the deformation function, an effect similar to that of the MS-SSIM may be obtained, that is, different quantization steps may obtain a PSNR value equivalent to a PSNR value obtained by the independent training model (R+λ*D).

In the first aspect of the embodiments of this disclosure, with the training of the training device 3, the image encoder 11 and the image decoder 21 may be obtained, and the image encoding apparatus 1 with the image encoder 11 may easily achieve adjustment of different bit rates. Furthermore, the image decoding apparatus 2 having the image decoder 21 may be adapted to different bit rates.

Operations of the image encoding apparatus 1 and the image decoding apparatus 2 related to the quantizing processing shall be described below.

In at least one embodiment, the quantizing processing of the quantizer 12 may be non-uniform quantizing processing.

The non-uniform quantizing processing may include: taking the latent variable z to which a probability distribution peak value (or center value) of the latent variable z corresponds as a zero point, and making the latent variable z in a first range containing the zero point correspond to the first quantized latent variable $\hat{z}\_enc$; for other quantized latent variables $\hat{z}\_enc$ than the first quantized latent variable $\hat{z}\_enc$, each quantized latent variable $\hat{z}\_enc$ corresponds to the latent variable z in a second range, the second range being not greater than the first range. The probability distribution peak value of the latent variable z may be obtained based on the entropy model 14.

For example, the quantizer 12 may perform the quantizing processing by using the following formula (6):

$$\hat{z}\_enc = \text{sign}(z) \times \text{floor}\left(\frac{\text{abs}(z)}{Q} + \text{offset}\right); \quad (6)$$

where, sign (z) denotes a symbol of the latent variable z, for example, if z is greater than 0, sign (z) is positive, and if z is less than 0, sign (z) is negative; floor ( ) denotes rounding down, abs (z) denotes that an absolute value of z is taken; and offset is a preset offset, $0 \leq \text{offset} \leq 0.5$.

In this disclosure, offset may be used to set a length of the first range, that is, the length of the first range is 2*(1−offset)*Q. A length of the second range is equal to the quantization step Q.

In at least one embodiment, the offset is not equal to 0.5, the length of the second range is less than the length of the first range, and the quantizing processing performed by the quantizer 12 is non-uniform quantizing processing. Therefore, after the quantizing processing, the entropy of the quantized latent variable $\hat{z}\_enc$ is smaller. In addition, this disclosure is not limited thereto. For example, when the offset is equal to 0.5, the length of the second range is equal to the length of the first range, and the quantizing processing performed by the quantizer 12 is uniform quantizing processing.

The quantized latent variable $\hat{z}\_enc$ generated by the quantizer 12 is subjected to entropy coding by the entropy encoder 13 to form a bit stream 100. The bit stream 100 is entropy-decoded by the entropy decoder 23, so that the quantized latent variable $\hat{z}\_enc$ is obtained in the image decoding apparatus 2.

In at least one embodiment, the de-quantizer 22 may perform de-quantizing processing by using the quantization step Q. For example, the de-quantizer 22 may de-quantize the quantized latent variable $\hat{z}\_enc$ outputted by the entropy decoder 23 by using the following formula (7), thereby obtaining the reconstructed latent variable $\hat{z}$:

$$\hat{z} = \hat{z}\_enc \cdot Q \quad (7).$$

Based on the entropy model 14, a cumulative density function (CDF) of the reconstructed latent variable $\hat{z}$ may be obtained, z is quantized by the quantizer 12, and z may be quantized to the corresponding representative value $\hat{z}$ based on the quantization step. A high bound of an interval of z to which $\hat{z}$ corresponds is $z_{high}$, and a lower bound thereof is $z_{low}$, that is, z in the interval $[z_{low}, z_{high}]$ will be all quantized to corresponding $\hat{z}$; where, $\hat{z}\_enc = \hat{z}/Q$, and $0 < \omega < 1$.

$$z_{high} = (\hat{z}\_enc + 0.5 + \text{sign}(\text{sign}(\hat{z}\_enc) + \omega) \times (0.5 - \text{offset})) \times Q \quad (8),$$

$$z_{low} = (\hat{z}\_enc + 0.5 - \text{sign}(\text{sign}(\hat{z}\_enc) - \omega) \times (0.5 - \text{offset})) \times Q \quad (9).$$

According to $z_{high}$ and $z_{low}$, a bit rate $R_{\hat{z}}$ of the reconstructed latent variable $\hat{z}$ may be obtained by using formula (10) below:

$$R_{\hat{z}} = -\frac{\sum \log_2(P(\hat{z}))}{(H \times W)} = -\sum \log_2(CDF(z_{high}) - CDF(z_{low}))/(H \times W). \quad (10)$$

Figure 3:
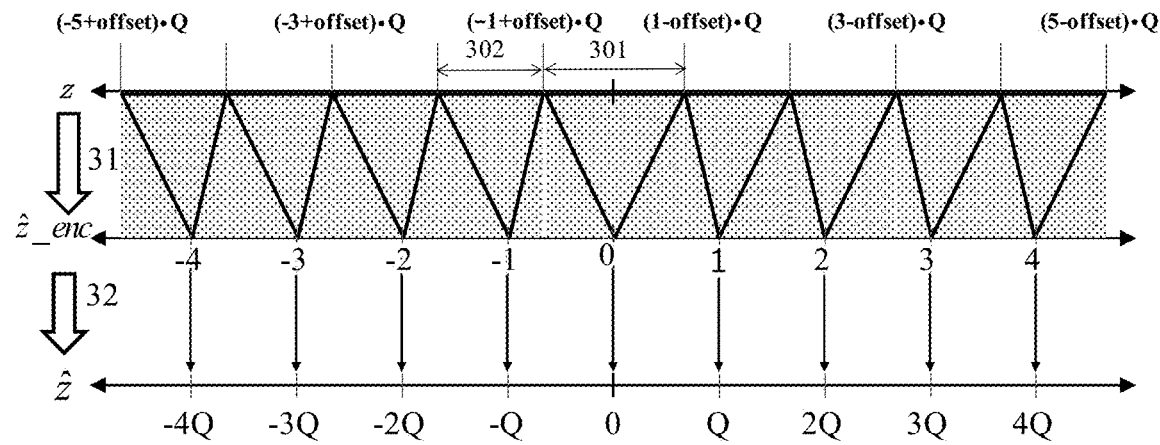
FIG. 3 is a schematic diagram of quantizing processing of the quantizer and de-quantizing processing of the de-quantizer of an embodiment of this disclosure.

FIG. 3 is a schematic diagram of quantizing processing of the quantizer 12 and de-quantizing processing of the de-quantizer 22. As shown in FIG. 3, arrow 31 denotes the quantizing processing of the quantizer 12, and arrow 32 denotes the de-quantizing processing of the de-quantizer 22.

As shown in FIG. 3, with, for example, the quantizing processing of formula (6), the latent variable z is mapped onto the quantized latent variable ẑ_enc. For example, latent variables z in the first range (interval) shown in 301 are all mapped onto the quantized latent variables ẑ_enc with a value of 0; and the latent variables z are equally divided into a plurality of second ranges (intervals) 302 outside the first range, and in the second range 302, the latent variables z are mapped onto the quantized latent variables ẑ_enc to which the second ranges 302 correspond.

As shown in FIG. 3, with, for example, the de-quantizing processing of formula (7), the quantized latent variables ẑ_enc are mapped onto corresponding reconstructed latent variables ẑ.

As shown in FIG. 1, the image encoding apparatus 1 may further include a first quantization step adjuster 15. The first quantization step adjuster 15 may adjust the quantization step Q used by the quantizer 12, so as to adjust a bit rate of the bit stream 100.

As shown in FIG. 1, the image decoding apparatus 2 may further include a second quantization step adjuster 25. The second quantization step adjuster 25 may adjust the quantization step Q used by the de-quantizer 22. For example, the second quantization step adjuster 25 may adjust the quantization step Q used by the de-quantizer 22 according to the quantization step Q adjusted by the first quantization step adjuster 15, thereby making the de-quantizer 22 and the quantizer 12 use the same quantization step Q.

In the image encoding apparatus 1 of this disclosure, the image encoder 11 is an image encoder based on an RaDOGAGA model. By adjusting the quantization step Q, the bit rate can be adjusted, so that the bit rate adjustment may be performed conveniently and quickly. While in a traditional method, the value of the loss function λ needs to be modified multiple times, and corresponding to each value of λ, it is needed to retrain the network of the encoder and determine a network of the encoder with a bit rate closest to a needed bit rate, and a process for adjusting a bit rate is relatively cumbersome.

In order to compare a performance of the image encoding apparatus 1 of this disclosure and that of a traditional image encoding apparatus, experiments were performed on the image encoding apparatus 1 of this disclosure and the traditional image encoding apparatus based on a universal test data set Kodak, and bit rate-distortion (R-D) curves of the two were drawn respectively. The traditional image encoding apparatus adopts an encoding network structure identical to that of Bane [2017], for example. In order to draw the R-D curve of the traditional image encoding apparatus, for different λ□{4, 8, 16, 32, 64, 96}, image codec networks were trained separately, and a deformation parameter $MS\_SSIM_{dB}$ was used to denote degrees of distortion of the image codec networks; where, $MS\_SSIM_{dB}=-10 \log_2(1-MS\_SSIM)$. Rs and Ds to the 6 image codec networks respectively correspond were fitted into a first curve.

For the image encoding apparatus 1 of this disclosure, a network structure of the image encoder 11 did not need to be trained multiple times, but the quantization steps Q were adjusted; where, Q∈{0.5,0.75,1,1.25,1.5,1.75,2,2.5,3,3.5, 4}, and the Rs and Ds to which the quantization steps correspond were calculated. The Rs and Ds to which the quantization steps Q respectively correspond were fitted to a second curve.

Figure 4:
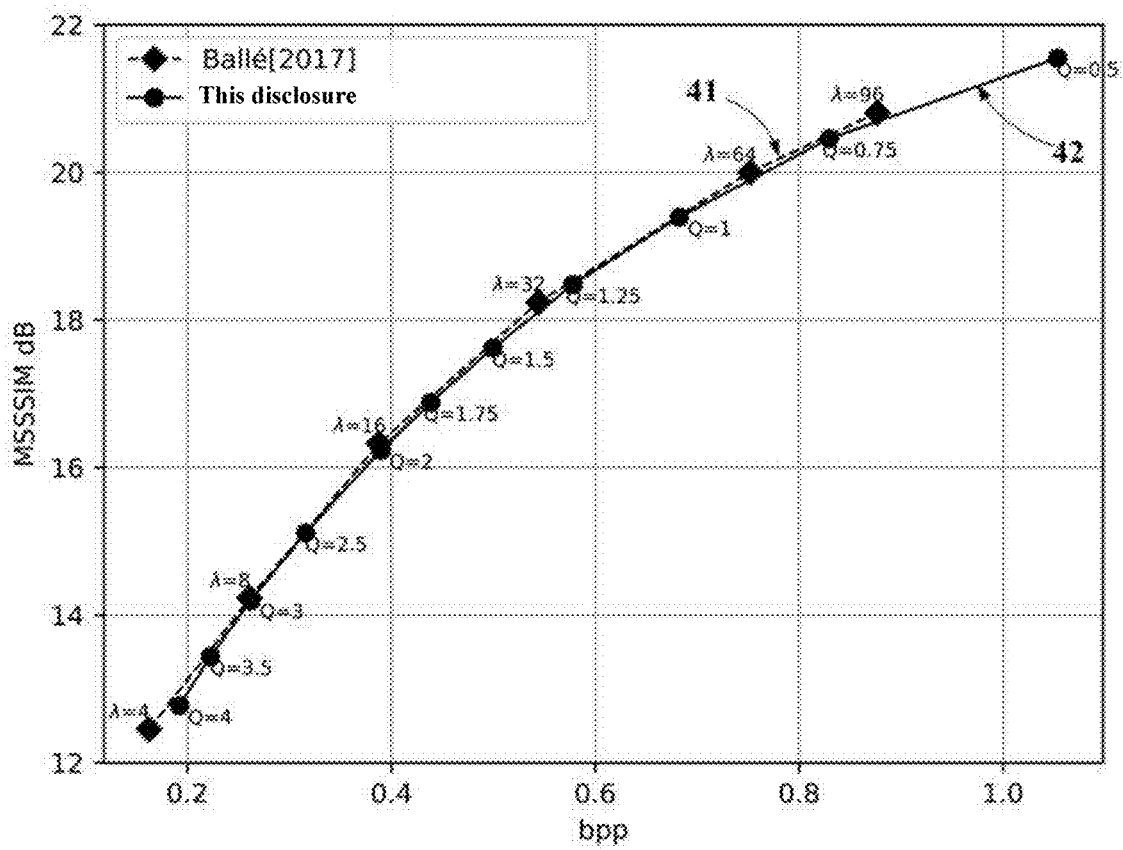
FIG. 4 is a schematic diagram of a first curve and a second curve of an embodiment of this disclosure.

FIG. 4 is a schematic diagram of the first curve and the second curve. In FIG. 4, the horizontal axis denotes the bit rate R in unit of bpp (bits per pixel), and the vertical axis is a degree of distortion denoted by MS-SSIM in unit of dB (decibel).

In FIG. 4, a point "λ=64" on the first curve 41 may indicate that a loss function used to train the model is (R+λ*D) as described in the background art; where, λ=64, that is, the loss function is (R+64*D), and so on; and "Q=1" on the second curve indicates that the quantization step Q=1, and so on.

As shown in FIG. 4, the R-D characteristic of the second curve 42 is close to the R-D characteristic of the first curve 41, that is, the image encoding apparatus 1 of this disclosure may adjust the bit rate by adjusting quantization step Q only, without training the network structure of the image encoder 11 multiple times, and the R-D characteristic is not degraded. Therefore, the image encoding apparatus 1 of this disclosure may perform bit rate adjustment in a simple and fast manner.

Embodiment of the Second Aspect

The embodiment of this disclosure provides an image encoding method, an image decoding method and a training method.

Figure 5:
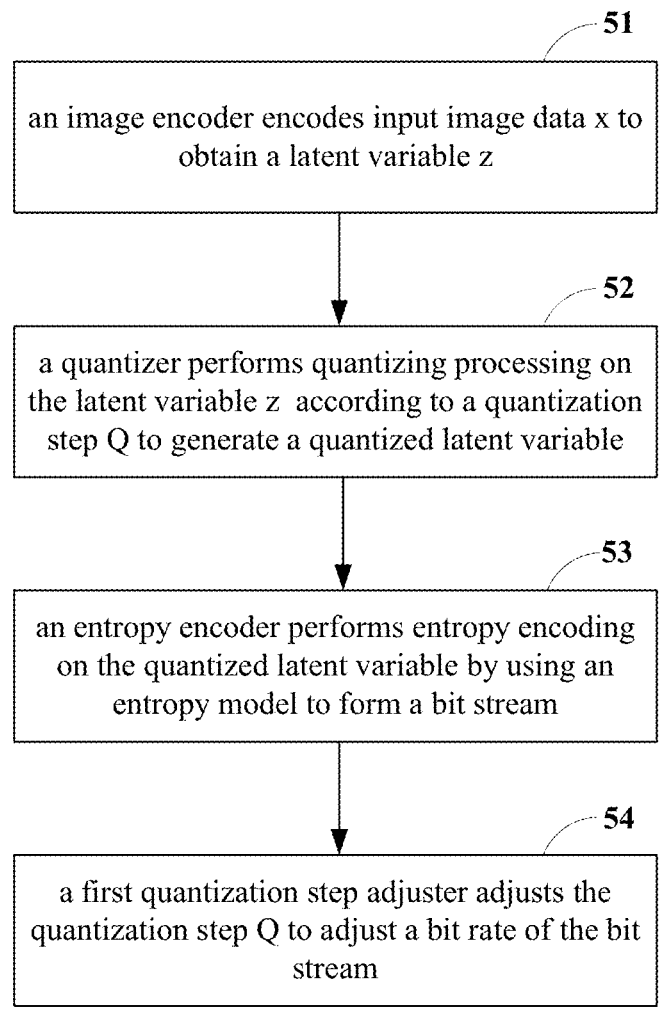
FIG. 5 is a schematic diagram of the image encoding method of an embodiment of this disclosure.

FIG. 5 is a schematic diagram of the image encoding method of the embodiment of the second aspect of this disclosure. As shown in FIG. 5, the image encoding method includes:

operation 51: an image encoder encodes input image data x to obtain a latent variable z;

operation 52: a quantizer performs quantizing processing on the latent variable z according to a quantization step Q to generate a quantized latent variable; and operation 53: an entropy encoder performs entropy coding on the quantized latent variable by using an entropy model to form a bit stream.

As shown in FIG. 5, the image encoding method further includes:

operation 54: a first quantization step adjuster adjusts the quantization step Q to adjust a bit rate of the bit stream.

In at least one embodiment, the quantizing processing of the quantizer is non-uniform quantizing processing. The non-uniform quantizing processing includes:

taking a latent variable z to which a probability distribution peak value of the latent variable z corresponds as a zero point, a latent variable z in a first range containing the zero point corresponding to a first quantized latent variable; and for other quantized latent variables than the first quantized latent variable, the other quantized latent variables corresponding to latent variables z of a second range, the second range being not greater than the first range.

The probability distribution peak value of the latent variable z is obtained based on the entropy model.

Reference may be made to the description of corresponding units in FIG. 1 for description of the operations in FIG. 5.

Figure 6:
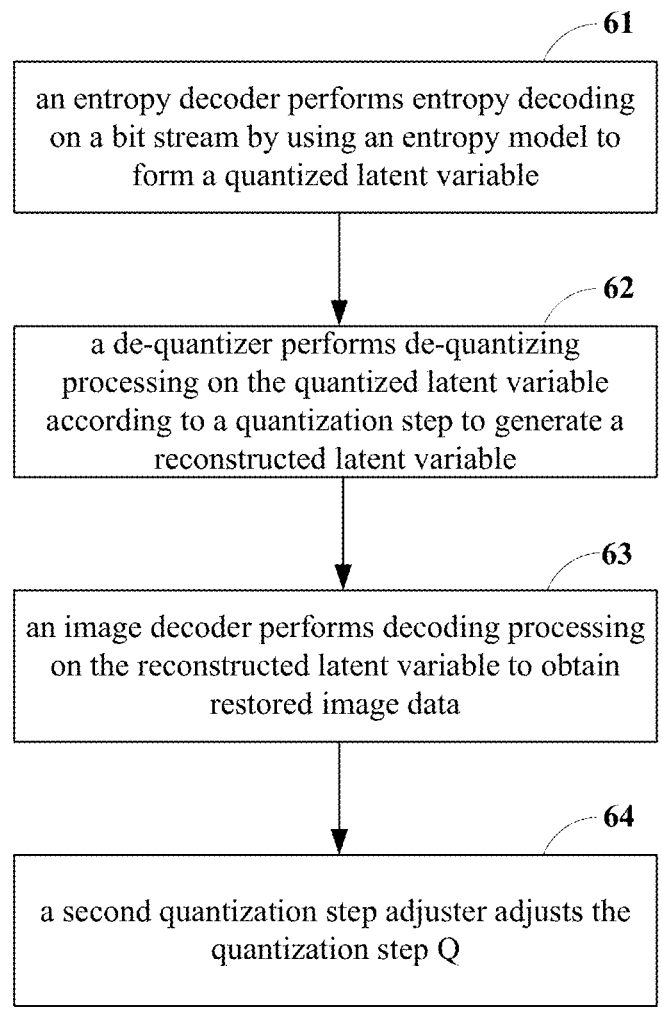
FIG. 6 is a schematic diagram of the image decoding method of an embodiment of this disclosure.

FIG. 6 is a schematic diagram of the image decoding method of the embodiment of the second aspect of this disclosure. As shown in FIG. 6, the image decoding method includes:

operation 61: an entropy decoder performs entropy decoding on a bit stream by using an entropy model to form a quantized latent variable;

operation 62: a de-quantizer performs de-quantizing processing on the quantized latent variable according to a quantization step to generate a reconstructed latent variable; and operation 63: an image decoder performs decoding processing on the reconstructed latent variable to obtain restored image data.

The de-quantizer in operation 62 performs the de-quantizing processing according to the quantization step.

As shown in FIG. 6, the image decoding method further includes:

operation 64: a second quantization step adjuster adjusts the quantization step Q.

Reference may be made to the description of corresponding units in FIG. 1 for description of the operations in FIG. 6.

Figure 7:
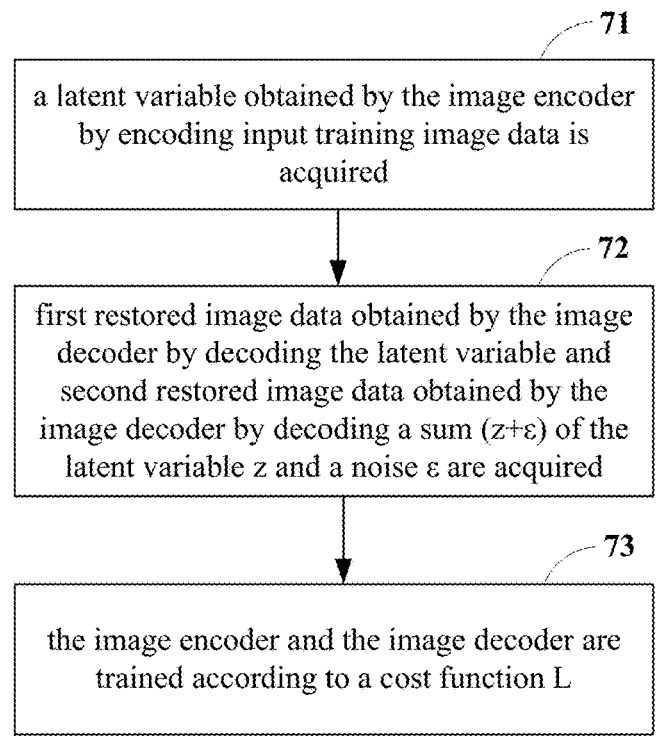
FIG. 7 is a schematic diagram of the training method of an embodiment of this disclosure.

FIG. 7 is a schematic diagram of the training method of the embodiment of the second aspect of this disclosure. As shown in FIG. 7, the training method includes:

operation 71: a latent variable obtained by the image encoder by encoding input training image data is acquired;

operation 72: first restored image data obtained by the image decoder by decoding the latent variable and second restored image data obtained by the image decoder by decoding a sum (z+ε) of the latent variable z and a noise E are acquired; and operation 73: the image encoder and the image decoder are trained according to a cost function L, the cost function L being related to a deviation between the input training image data x and the first restored image data and a deviation between the first restored image data and the second restored image data.

Reference may be made to the description of corresponding units in FIG. 2 for description of the operations in FIG. 7.

Embodiment of the Third Aspect

The embodiment of this disclosure provides an electronic device, including the image encoding apparatus 1, and/or the image decoding apparatus 2, and/or the training device 3, described in the embodiment of the first aspect, the contents of which being incorporated herein. The electronic device may be, for example, a computer, a server, a work station, a lap-top computer, and a smart mobile phone, etc.; however, the embodiment of this disclosure is not limited thereto.

Figure 8:
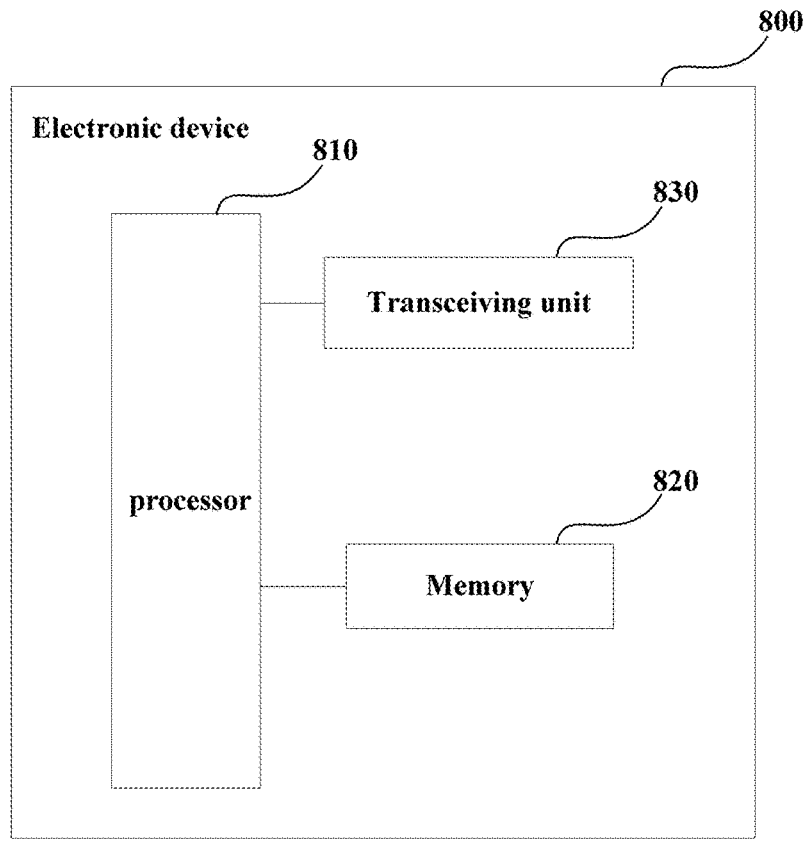
FIG. 8 is a schematic diagram of the electronic device of an embodiment of this disclosure.

FIG. 8 is a schematic diagram of a structure of the electronic device of the embodiment of this disclosure. As shown in FIG. 8, an electronic device 800 may include a processor (such as a central processing unit (CPU)) 810 and a memory 820, the memory 820 being coupled to the processor 810. The memory 820 may store various data, and furthermore, it may store a program for information processing, and execute the program under control of the processor 810.

In an embodiment, functions of the image encoding apparatus 1 and/or the image decoding apparatus 2 and/or the training device 3 may be integrated into the processor 810. The processor 810 may be configured to carry out the image encoding method and/or the image decoding method and/or the training method as described in the embodiment of the second aspect.

In another embodiment, the image encoding apparatus 1 and/or the image decoding apparatus 2 and/or the training device 3 and the processor 810 may be configured separately. For example, the image encoding apparatus 1 and/or the image decoding apparatus 2 and/or the training device 3 may be configured as a chip connected to the processor 810, and the functions of the image encoding apparatus 1 and/or the image decoding apparatus 2 and/or the training device 3 are executed under control of the processor 810.

Reference may be made to embodiments 1 and 2 for particular implementation of the processor 810, which shall not be described herein any further.

Furthermore, as shown in FIG. 8, the electronic device 800 may further include a transceiving unit 830, etc. Functions of the above components are similar to those in the related art, and shall not be described herein any further. It should be noted that the electronic device 800 does not necessarily include all the parts shown in FIG. 8, and furthermore, the electronic device 800 may include parts not shown in FIG. 8, and the related art may be referred to.

An embodiment of the present disclosure provides a computer readable program code, which, when executed in an image encoding apparatus and/or an image decoding apparatus and/or a training device, will cause a computer to carry out the image encoding method and/or the image decoding method and/or the training method described in the embodiment of the second aspect in the image encoding apparatus and/or the image decoding apparatus and/or the training device.

An embodiment of the present disclosure provides a computer storage medium, including a computer readable program code, which will cause a computer to carry out the image encoding method and/or the image decoding method and/or the training method described in the embodiment of the second aspect in an image encoding apparatus and/or an image decoding apparatus and/or a training device.

The image encoding apparatus or the image decoding apparatus or the training device described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of an image encoding apparatus or an image decoding apparatus, and may also be stored in a memory card of an image encoding apparatus or an image decoding apparatus.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

1. A training device for an image processing apparatus, in which an image encoder and an image decoder are trained by using a training image, the training device including:
a first acquiring unit configured to acquire a latent variable z obtained by the image encoder by encoding input training image data;
a second acquiring unit configured to acquire first restored image data obtained by the image decoder by decoding the latent variable z and second restored image data obtained by the image decoder by decoding a sum $(z+\varepsilon)$ of the latent variable z and a noise $\varepsilon$; and
a training unit configured to train the image encoder and the image decoder according to a cost function L, the cost function L being related to a deviation between the input training image data x and the first restored image data and a deviation between the first restored image data and the second restored image data.

2. An image encoding apparatus, including:
an image encoder configured to encode input image data x to obtain a latent variable z, the image encoder being obtained by training by the training device as described in the first aspect;
a quantizer configured to perform quantizing processing on the latent variable z according to a quantization step Q to generate a quantized latent variable; and
an entropy encoder configured to perform entropy coding on the quantized latent variable by using an entropy model to form a bit stream.

3. The image encoding apparatus according to supplement 2, wherein the image encoding apparatus further includes:
a first quantization step adjuster configured to adjust the quantization step Q to adjust a bit rate of the bit stream.

4. The image encoding apparatus according to supplement 2, wherein,
the quantizing processing of the quantizer is non-uniform quantizing processing.

5. The image encoding apparatus according to supplement 4, wherein,
the non-uniform quantizing processing includes:
taking a latent variable z to which a probability distribution peak value of the latent variable z corresponds as a zero point, a latent variable of a first range containing the zero point corresponding to a first quantized latent variable; and
for other quantized latent variables than the first quantized latent variables, the other quantized latent variables corresponding to latent variables z of a second range, the second range being not greater than the first range.

6. The image encoding apparatus according to supplement 5, wherein,
the probability distribution peak value of the latent variable z is obtained based on the entropy model.

7. An image decoding apparatus, characterized in that the image decoding apparatus includes:
an entropy decoder configured to perform entropy decoding on a bit stream by using an entropy model to form a quantized latent variable;
a de-quantizer configured to perform de-quantizing processing on the quantized latent variable according to a quantization step Q to generate a reconstructed latent variable; and
an image decoder configured to perform decoding processing on the reconstructed latent variable to obtain restored image data $\hat{x}$, the image decoder being obtained by training by the training device as described in supplement 1.

8. The image decoding apparatus according to supplement 7, wherein,
the de-quantizer performs the de-quantizing processing according to the quantization step.

9. The image decoding apparatus according to supplement 7, wherein the image decoding apparatus further includes:
a second quantization step adjuster configured to adjust the quantization step Q.

10. A training method for an image processing apparatus, in which an image encoder and an image decoder are trained by using a training image, the training method including:
acquiring a latent variable z obtained by the image encoder by encoding input training image data;
acquiring first restored image data obtained by the image decoder by decoding the latent variable z and second restored image data obtained by the image decoder by decoding a sum $(z+\varepsilon)$ of the latent variable z and a noise $\varepsilon$; and
training the image encoder and the image decoder according to a cost function L, the cost function L being related to a deviation between the input training image data x and the first restored image data and a deviation between the first restored image data and the second restored image data.

11. An image encoding method, including:
encoding input image data x by an image encoder to obtain a latent variable z, the image encoder being obtained in the training method described in supplement 10;
performing quantizing processing on the latent variable z by a quantizer according to a quantization step Q to generate a quantized latent variable; and
performing entropy coding on the quantized latent variable by an entropy encoder by using an entropy model to form a bit stream.

12. The image encoding method according to supplement 11, wherein the image encoding method further includes:
adjusting the quantization step Q by a first quantization step adjuster to adjust a bit rate of the bit stream.

13. The image encoding method according to supplement 11, wherein,
the quantizing processing of the quantizer is non-uniform quantizing processing.

14. The image encoding method according to supplement 13, wherein,
the non-uniform quantizing processing includes:
taking a latent variable z to which a probability distribution peak value of the latent variable z corresponds as a zero point, a latent variable z of a first range containing the zero point corresponding to a first quantized latent variable; and for other quantized latent variables than the first quantized latent variables, the other quantized latent variables corresponding to latent variables z of a second range, the second range being not greater than the first range.

15. The image encoding method according to supplement 14, wherein, the probability distribution peak value of the latent variable z is obtained based on the entropy model.

16. An image encoding method, including:

performing entropy decoding on a bit stream by an entropy decoder by using an entropy model to form a quantized latent variable;

performing de-quantizing processing on the quantized latent variable by a de-quantizer according to a quantization step to generate a reconstructed latent variable; and performing decoding processing on the reconstructed latent variable by an image decoder to obtain restored image data.

17. The image decoding method according to supplement 16, wherein, the de-quantizer performs the de-quantizing processing according to the quantization step.

18. The image decoding method according to supplement 16, wherein the image decoding method further includes:

adjusting the quantization step Q by a second quantization step adjuster.

What is claimed is:

1. A training device for an image processing apparatus, in which an image encoder and an image decoder are trained by using a training image, the training device comprises:
   a memory to store a plurality of instructions; and
   a processor coupled to the memory and configured to:
      acquire a latent variable obtained by the image encoder by encoding input training image data;
      acquire first restored image data obtained by the image decoder by decoding the latent variable and second restored image data obtained by the image decoder by decoding a sum of the latent variable and a noise; and
      train the image encoder and the image decoder according to a cost function, the cost function being related to a deviation between the input training image data and the first restored image data and a deviation between the first restored image data and the second restored image data.

2. An image encoding apparatus, comprising:
   an image encoder configured to encode input image data to obtain a latent variable, the image encoder encoding the input image data according to training by the training device as claimed in claim 1;
   a quantizer configured to perform quantizing processing on the latent variable according to a quantization operation to generate a quantized latent variable; and
   an entropy encoder configured to perform entropy coding on the quantized latent variable by using an entropy model to form a bit stream.

3. The image encoding apparatus according to claim 2, wherein the image encoding apparatus further comprises:
   a quantization adjuster configured to adjust the quantization operation to adjust a bit rate of the bit stream.

4. The image encoding apparatus according to claim 2, wherein,
   the quantizing processing of the quantizer is non-uniform quantizing processing.

5. The image encoding apparatus according to claim 4, wherein,
   the non-uniform quantizing processing comprises:
      taking a latent variable to which a probability distribution peak value of the latent variable corresponds as a zero point, a latent variable of a first range containing the zero point corresponding to a first quantized latent variable; and
      for other quantized latent variables than the first quantized latent variables, the other quantized latent variables corresponding to latent variables of a second range, the second range being less than the first range.

6. The image encoding apparatus according to claim 5, wherein,
   the probability distribution peak value of the latent variable is obtained based on the entropy model.

7. An image decoding apparatus, comprising:
   an entropy decoder configured to perform entropy decoding on a bit stream by using an entropy model to form a quantized latent variable;
   a de-quantizer configured to perform de-quantizing processing on the quantized latent variable according to a quantization operation to generate a reconstructed latent variable; and
   an image decoder configured to perform decoding processing on the reconstructed latent variable to obtain restored image data, the image decoder performing the decoding processing according to training by the training device as claimed in claim 1.

8. The image decoding apparatus according to claim 7, wherein,
   the de-quantizer performs the de-quantizing processing according to the quantization operation.

9. The image decoding apparatus according to claim 7, wherein the image decoding apparatus further comprises:
   a quantization adjuster configured to adjust the quantization operation.

* * * * *